(12) United States Patent  
Hotes et al.

(10) Patent No.: US 9,161,204 B2  
(45) Date of Patent: Oct. 13, 2015

(54) SYSTEM AND METHOD FOR DETERMINING MOBILE DEVICE LOCATION

(71) Applicant: Wavemarket, Inc., Emeryville, CA (US)

(72) Inventors: Scott Hotes, Berkeley, CA (US); Anthony Polito, San Francisco, CA (US); Tasos Roumeliotis, Orinda, CA (US)

(73) Assignee: Location Labs, Inc., Emeryville, CA (US)

( * ) Notice: Subject to any disclaimer, the term of this patent is extended or adjusted under 35 U.S.C. 154(b) by 94 days.

(21) Appl. No.: 14/010,472

(22) Filed: Aug. 26, 2013

(65) Prior Publication Data

US 2013/0344891 A1    Dec. 26, 2013

Related U.S. Application Data

(60) Continuation of application No. 13/555,429, filed on Jul. 23, 2012, now Pat. No. 8,521,152, which is a division of application No. 12/813,845, filed on Jun. 11, 2010, now Pat. No. 8,229,421.

(60) Provisional application No. 61/316,379, filed on Mar. 22, 2010.

(51) Int. Cl.
| | |
|---|---|
| *H04W 8/08* | (2009.01) |
| *G01S 5/02* | (2010.01) |
| *G01S 19/34* | (2010.01) |
| *H04W 64/00* | (2009.01) |

(52) U.S. Cl.
CPC ............... *H04W 8/08* (2013.01); *G01S 5/0221* (2013.01); *G01S 19/34* (2013.01); *H04W 64/00* (2013.01)

(58) Field of Classification Search
USPC .......................... 455/456.1, 423, 552.1–553.1
See application file for complete search history.

(56) References Cited

U.S. PATENT DOCUMENTS

| 7,046,962 | B1 | 5/2006 | Belcea |
| 7,463,890 | B2 | 12/2008 | Herz et al. |
| 7,653,218 | B1 | 1/2010 | Malitz et al. |
| 7,688,731 | B2 | 3/2010 | Haumont et al. |
| 7,813,326 | B1 | 10/2010 | Kelm et al. |
| 7,957,355 | B1 | 6/2011 | Heiferling et al. |
| 8,761,821 | B2 | 6/2014 | Tibbitts et al. |
| 2002/0128768 | A1 | 9/2002 | Nakano et al. |
| 2003/0016770 | A1 | 1/2003 | Trans et al. |

(Continued)

OTHER PUBLICATIONS

U.S. Appl. No. 61/227,404, filed Jul. 21, 2009.

(Continued)

*Primary Examiner* — Diane Mizrahi  
(74) *Attorney, Agent, or Firm* — Dovas Law, P.C.

(57) ABSTRACT

A computer-implemented mobile device locating method is provided. The method includes determining a current cell sector of a mobile device and comparing the current cell sector with a cell sector list of previously determined cell sectors. A current location of the mobile device is determined if the current cell sector is not listed in the cell sector list. The current location is compared with a last determined location. The current cell sector is added to the cell sector list if the current location is substantially the same as the last determined location. The cell sector list is cleared if the current location is not substantially the same as the last determined location.

5 Claims, 12 Drawing Sheets

(56) References Cited

U.S. PATENT DOCUMENTS

| | | |
|---|---|---|
| 2003/0086515 A1 | 5/2003 | Trans et al. |
| 2003/0156543 A1 | 8/2003 | Sahinoglu et al. |
| 2004/0146007 A1 | 7/2004 | Saadawi et al. |
| 2005/0122259 A1* | 6/2005 | Sairo et al. ............ 342/357.1 |
| 2005/0186933 A1 | 8/2005 | Trans |
| 2005/0286464 A1 | 12/2005 | Saadawi et al. |
| 2006/0050820 A1 | 3/2006 | Kawada et al. |
| 2006/0253526 A1 | 11/2006 | Welch et al. |
| 2007/0189154 A1 | 8/2007 | Hourtane et al. |
| 2009/0067324 A1 | 3/2009 | Licardie et al. |
| 2009/0175238 A1 | 7/2009 | Jetcheva et al. |
| 2009/0245118 A1 | 10/2009 | McCormick |
| 2010/0120429 A1 | 5/2010 | Kazmi et al. |
| 2010/0272268 A1* | 10/2010 | Sambhwani et al. ....... 380/287 |
| 2010/0285815 A1 | 11/2010 | Treu et al. |
| 2010/0323659 A1 | 12/2010 | Wehling |
| 2011/0164527 A1 | 7/2011 | Mishra et al. |
| 2011/0250871 A1* | 10/2011 | Huang et al. ............ 455/412.2 |
| 2011/0257883 A1 | 10/2011 | Kuznetsov |
| 2011/0267981 A1 | 11/2011 | Davies |
| 2011/0268022 A1 | 11/2011 | Xu |
| 2013/0084847 A1* | 4/2013 | Tibbitts et al. ............ 455/419 |

OTHER PUBLICATIONS

U.S. Appl. No. 61/267,064, filed Dec. 6, 2009.

A comparative study of wireless protocols: Bluetooth, UWB, ZigBee, and Wi-Fi, Karunakar Pothuganti and Anusha Chitneni, Department of Electrical Engineering and Communication Engineering, ISSN 2231-1297, vol. 4, No. 6 (2014), pp. 655-662.

* cited by examiner

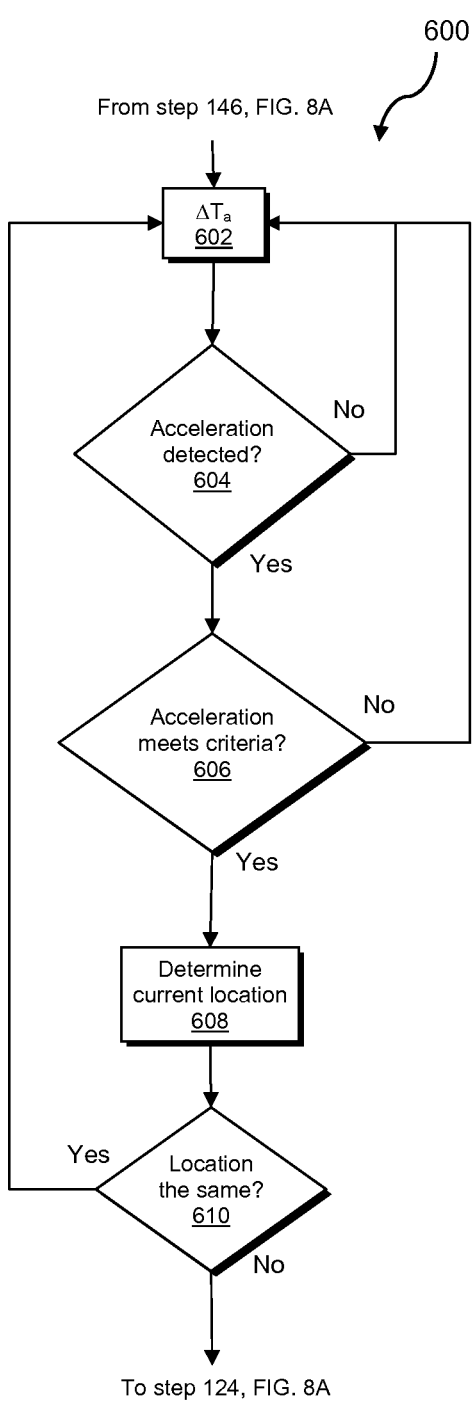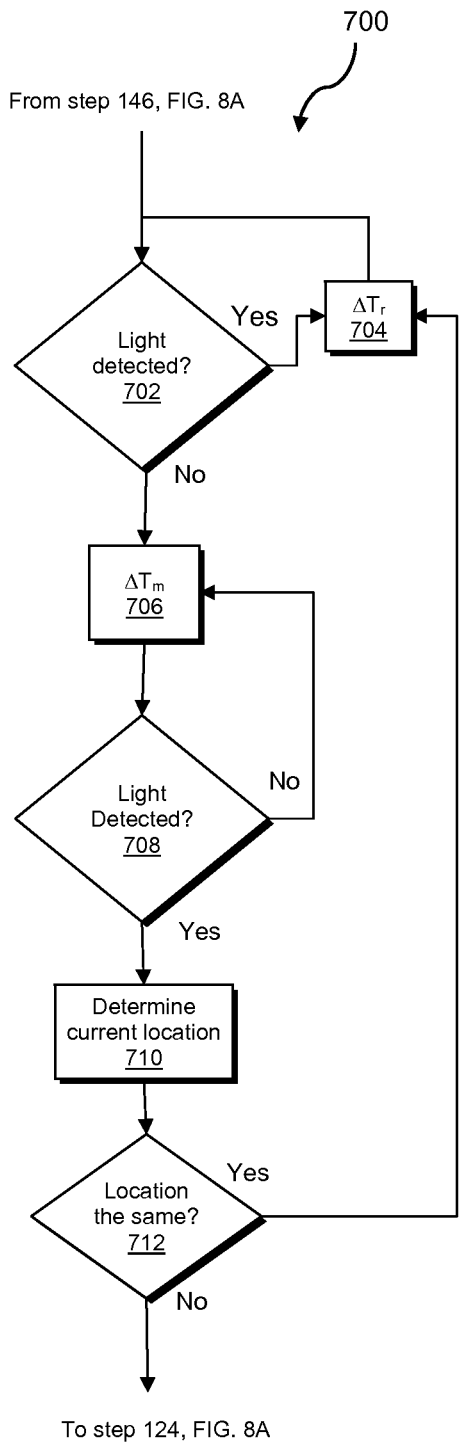
FIG. 8B
FIG. 8C

SYSTEM AND METHOD FOR DETERMINING MOBILE DEVICE LOCATION

CROSS REFERENCE TO RELATED APPLICATION(S)

This application is a continuation of U.S. patent application Ser. No. 13/555,429, filed Jul. 23, 2012, which is a divisional of U.S. patent application Ser. No. 12/813,845, filed Jun. 11, 2010, now U.S. Pat. No. 8,229,421 patented Jul. 24, 2012, which claims the benefit of U.S. Provisional Patent Application No. 61/316,379, filed Mar. 22, 2010. application Ser. Nos. 13/555,429, 12/813,845 and 61/316,379 are incorporated by reference as if fully set forth.

BACKGROUND

On battery powered devices such as mobile phones, using device positioning resources such as Global Positioning System ("GPS"), Assisted GPS ("AGPS"), and Advanced Forward Link Trilateration ("AFLT") can be a significant drain on the battery. In order to provide a location stream for such a device there are limited numbers of location determinations, referred to in the art as "locates", which can be performed before the device battery is drained. In practice this number is fairly low, with current technologies typically permitting 50-100 locates per battery charge, depending on the technology used. Moreover, generating or retrieving location information may use valuable bandwidth, processing and memory resources which are needed for other functions of a mobile device. A telecommunication service provider's network infrastructure may also be burdened by use of bandwidth, processing and memory resources as a result of location operations, especially in the case of network-based location operations.

The state of the art approach of locating a mobile device is to attain a mobile device location at a constant rate. This approach however will frequently require an undesirably long interval between location determinations to conserve power and other system resources, resulting in an undesirable level of latency, especially when the device is in motion and frequent location updates are necessary. Increasing the constant rate at which mobile device locations are attained typically results in quick draining of the device battery and overuse of system resources. It would be desirable to attain location from a mobile device in a manner which minimizes device power consumption and consumption of other system resources without causing undesirable level of latency for applications using such location.

SUMMARY

The invention provides a computer-implemented mobile device locating method. The method includes determining a current cell sector of a mobile device and comparing the current cell sector with a cell sector list of previously determined cell sectors. A current location of the mobile device is determined if the current cell sector is not listed in the cell sector list. The current location is compared with a prior location including a last determined location. The current cell sector is added to the cell sector list if the current location is substantially the same as the last determined location. The cell sector list is cleared if the current location is not substantially the same as the last determined location.

The invention further provides a computer-implemented mobile device locating method including determining a current location of a mobile device at a first predetermined frequency and comparing the current location with one or more prior determined locations to detect a location change. The current location is determined at a second predetermined frequency greater than the first predetermined frequency for a predetermined period of time in response to the location change. The current location is determined at the first predetermined frequency after the expiration of the predetermined period of time.

The invention further provides a computer-implemented mobile device locating method including determining a current location of a mobile device at a first predetermined frequency and detecting an external action. The current location is determined at the second predetermined frequency greater than the first predetermined frequency for a predetermined period of time in response to the external action. The current location is determined at the first predetermined frequency after the expiration of the predetermined period of time.

The invention further provides a computer-implemented mobile device locating method including determining a current location of a mobile device at a first predetermined frequency for a plurality of days. The current location is determined at a second predetermined frequency greater than the first predetermined frequency for a predetermined period of time in response to a current time corresponding to at least one prior day's time corresponding to a location change. The current location is determined at the first predetermined frequency after the expiration of the predetermined period of time.

The invention further provides a computer-implemented mobile device locating method including receiving from at least one of a user and an application at least one of an indication of a time period and an indication of a location. A current location of a mobile device is determined at a first predetermined frequency. The current location is determined at a second predetermined frequency greater than the first predetermined frequency for a predetermined period of time in response to the current time corresponding to the indication of the time period or the current location corresponding to the indication of the location. The current location is determined at the first predetermined frequency after the expiration of the predetermined period of time.

The invention further provides a mobile device comprising at least one computing device including at least one memory comprising instructions operable to enable the computing device to perform a procedure. The procedure includes determining a current location of a mobile device at a first predetermined frequency and comparing the current location with a prior determined location to detect a location change. The procedure further includes determining the current location at a second predetermined frequency greater than the first predetermined frequency for a predetermined period of time in response to the location change, and determining the current location at the first predetermined frequency after the expiration of the predetermined period of time.

BRIEF DESCRIPTION OF THE DRAWING(S)

The foregoing Summary as well as the following detailed description will be readily understood in conjunction with the appended drawings which illustrate preferred embodiments of the invention. In the drawings:

FIGS. 8A-8C show a process diagram depicting a mobile device locating method according to a fifth preferred embodiment of the invention.

DETAILED DESCRIPTION OF THE PREFERRED EMBODIMENT(S)

Figure 1A:
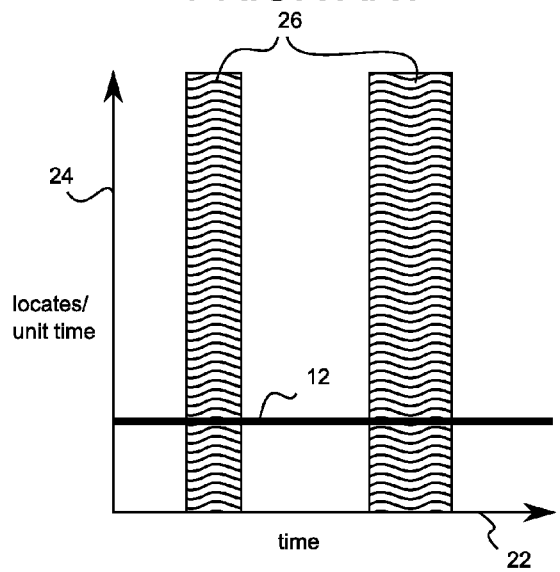
FIG. 1A shows a graph of locates per unit time versus unit time for an example mobile device for which a prior art locating method is implemented.

The preferred embodiments of the invention are described below with reference to the drawing figures where like numerals represent like elements throughout.

Often, mobile device users are relatively stationary throughout most of the day. According to the preferred embodiments of the invention, knowledge of stationary behavior can be exploited in order to provide better location accuracy without locating a mobile device too often. Ideally, for a mobile device at rest, the mobile device needs only to be located once while the device as at rest, and subsequent queries for the device location can be responded to with that resting location, and thereafter, the device does not need to be located again until the device starts to move. According to the invention, budgeted power and system resources can be conserved when the mobile device is at rest, and the power and system resources can be re-allocated to locating the device when it is moving, giving as accurate a location stream as possible with a limited available budget for power and other system resources. The preferred embodiments of the invention minimize power and other system resources allocated for location determination during time periods when a mobile device is determined to be static.

Figure 1B:
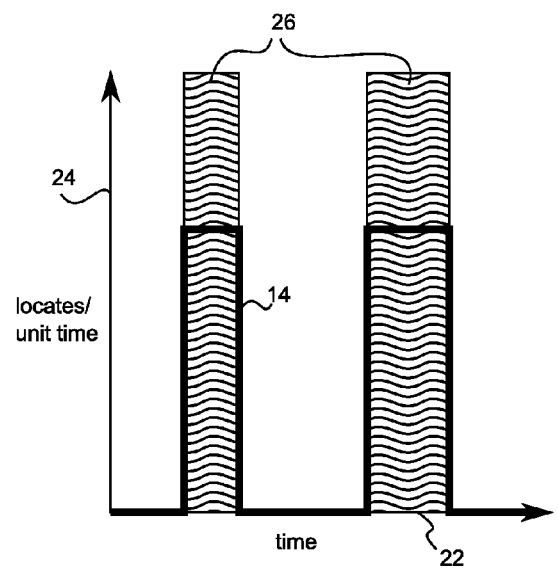
FIGS. 1B-1C show graphs of locates per unit time versus unit time for an example mobile device for which locating methods pursuant to preferred embodiments of the invention are implemented.
Figure 1C:
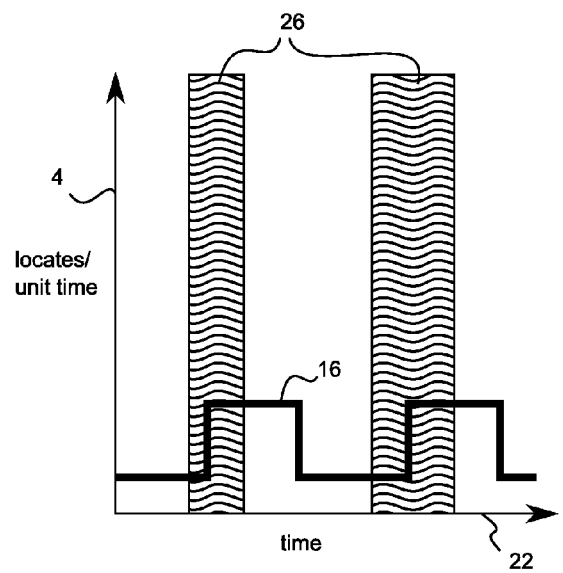

FIGS. 1A-1C show graphs of locates per unit time 24 versus unit time 22 for a particular mobile device. The graphs include periods of motion 26 where the mobile device is moving, and at all other times the particular mobile device is considered substantially motionless. FIG. 1A shows a constant period line 12 representing a condition in which locates per unit time remain constant regardless of whether or not the mobile device is in motion according to a prior art location method. FIG. 1B shows a preferred motion only line 14 representing an idealized condition according to a preferred embodiment of the invention in which locates per unit time are zero when the particular mobile device is at rest and an increased or maximum value when the mobile device is in motion. The condition shown by the motion only line 14 is superior to the constant period line 12 with respect to conserving power and system resources. FIG. 1C shows a line 16 representing a condition according to a preferred embodiment of the invention in which locates per unit time are constant for a duration of time and increase during periods the mobile device is in motion or near such periods. The line 16 of FIG. 1C is a representation of a non-idealized condition in which locates occur at a relatively low rate when the particular mobile device is not moving and for a transition period after the mobile device begins motion and prior to detection of motion, and the location rate is increased for at least a portion of the time when the particular mobile device is in motion and during a transition period after motion is stopped and prior to detection of the stop. The preferred embodiments of the invention may further correspond to other forms which are not depicted in FIG. 1B or 1C.

Figure 2:
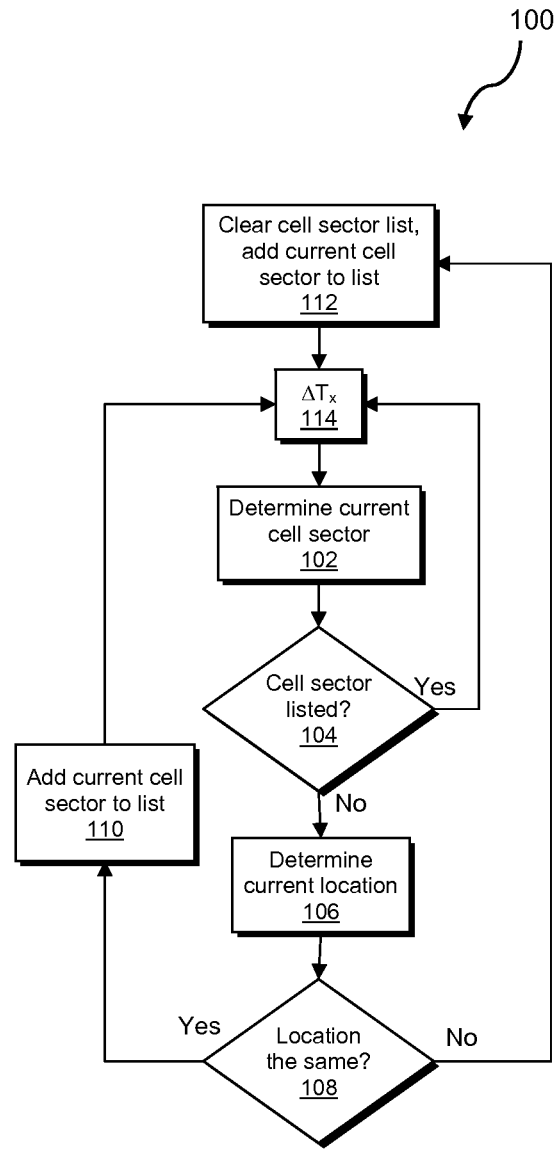
FIG. 2 shows a process diagram depicting a mobile device locating method according to a first preferred embodiment of the invention.
Figure 9:
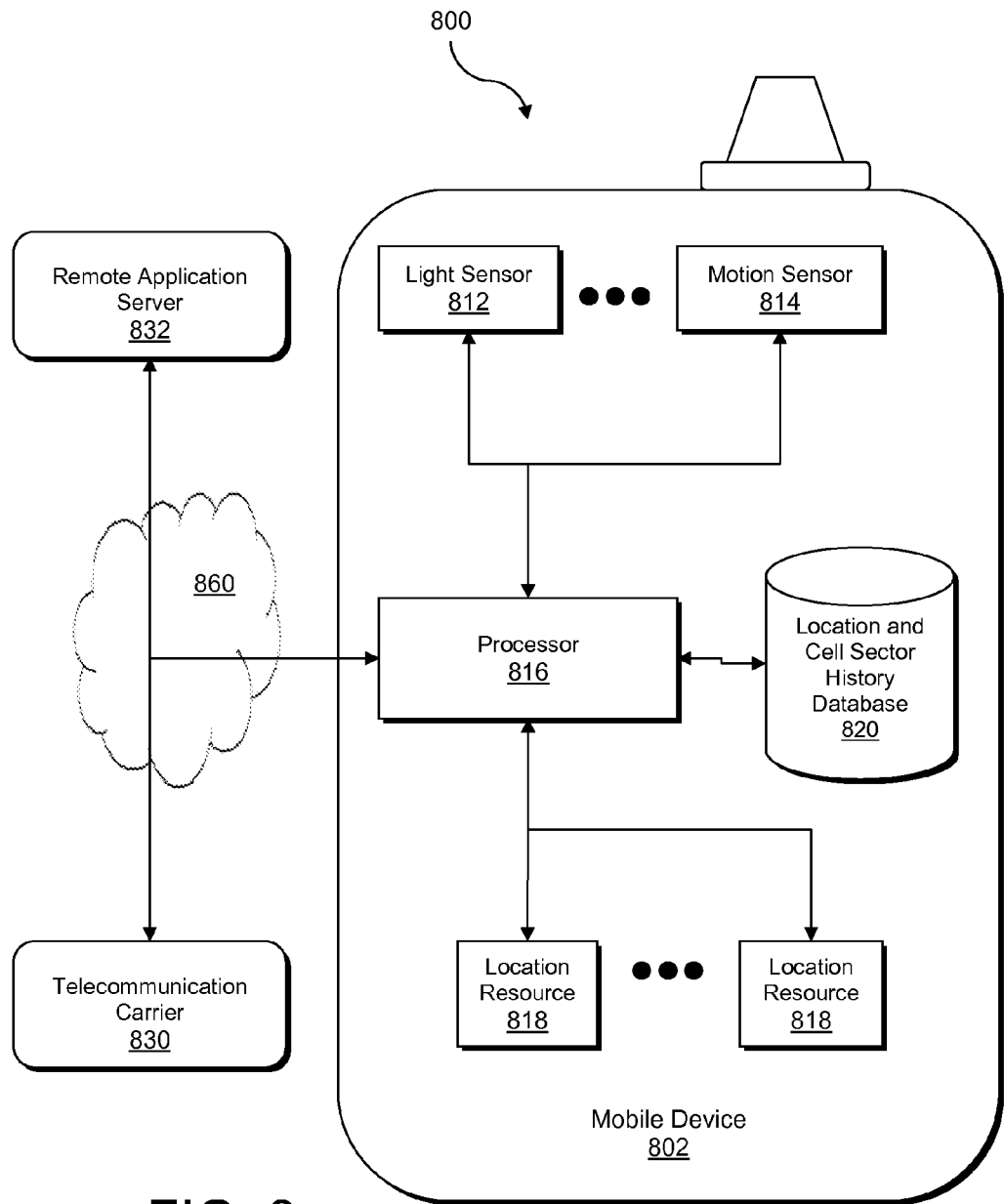
FIG. 9 shows a mobile device configured to implement a method according to a preferred embodiment of the invention.

Referring to FIG. 2, a process diagram depicting a computer-implemented mobile device locating method 100 according to a first preferred embodiment of the invention is shown. The locating method 100 is preferably implemented by a processor locally on a mobile device. A mobile device 802 suitable for implementing the method 100 via a processor 816 is shown in FIG. 9. Alternatively, the locating method 100 can be performed using any suitable mobile device or a remote system in communication with a mobile device via a network. The locating method 100 comprises determining a current cell sector of a mobile device (step 102) and comparing the current cell sector with a cell sector list of previously determined cell sectors (step 104). The list of previously determined cell sectors is stored in a history database such as the location and cell sector history database 820 of the mobile device 802 of FIG. 9. If the current cell sector is already listed in the stored cell sector list, the process returns to step 102, and the current cell sector is determined again, after a step 114 corresponding to a predetermined cycling time period $\Delta T_x$. The cycling time period $\Delta T_x$ is preferably between 1 and 30 seconds, or alternatively, any period suitable for a particular application.

If the current cell sector is not listed in the stored cell sector list, a current location of the mobile device is determined (step 106). The current location is preferably determined via a query to a local location determining resource such as one of the location determining resources 818 of the mobile device 802. The location determining resources 818 can include dedicated chipsets, for example a dedicated GPS, AGPS, or AFLT chipset, or alternatively can be a part of a multi-function chipset, for example a software-enabled mobile device CPU. The current location can alternatively be obtained via a query to location determining resources of a telecommunication carrier, such as a telecommunication carrier 830, via a network such as a network 860. The current location is compared with a last determined location stored in the history database (step 108). If the current location is substantially the same as the last determined location, the current cell sector is added to the list in the history database (step 110), and the process again determines the current cell sector (step 102) after the cycling time period $\Delta T_x$ of step 114. If the current location is not substantially the same as the last determined location the cell sector list is first cleared and the current cell sector is thereafter added to the cleared list (step 112), whereby the current cell sector is the only listed cell sector, and the process again determines the current cell sector (step 102) after the cycling time period $\Delta T_x$ of step 114. Alternatively, location is compared with a plurality of last determined locations or one or more prior determined locations determined earlier than the last determined location, which procedure is useful for example in cases where mobile device motion between successive cycling time periods $\Delta T_x$ occurs but is not sufficiently substantial to trigger step 112. The locating method 100 can be performed continually when activated by a user or an application, and can be similarly deactivated by the user or the application. In determining if the location is substantially the same, a tolerance is preferably introduced such that if the current location differs only by an insignificant predetermined distance from the last determined location, the current location is considered substantially the same as the last determined location, and step 112 is not triggered.

Figure 3:
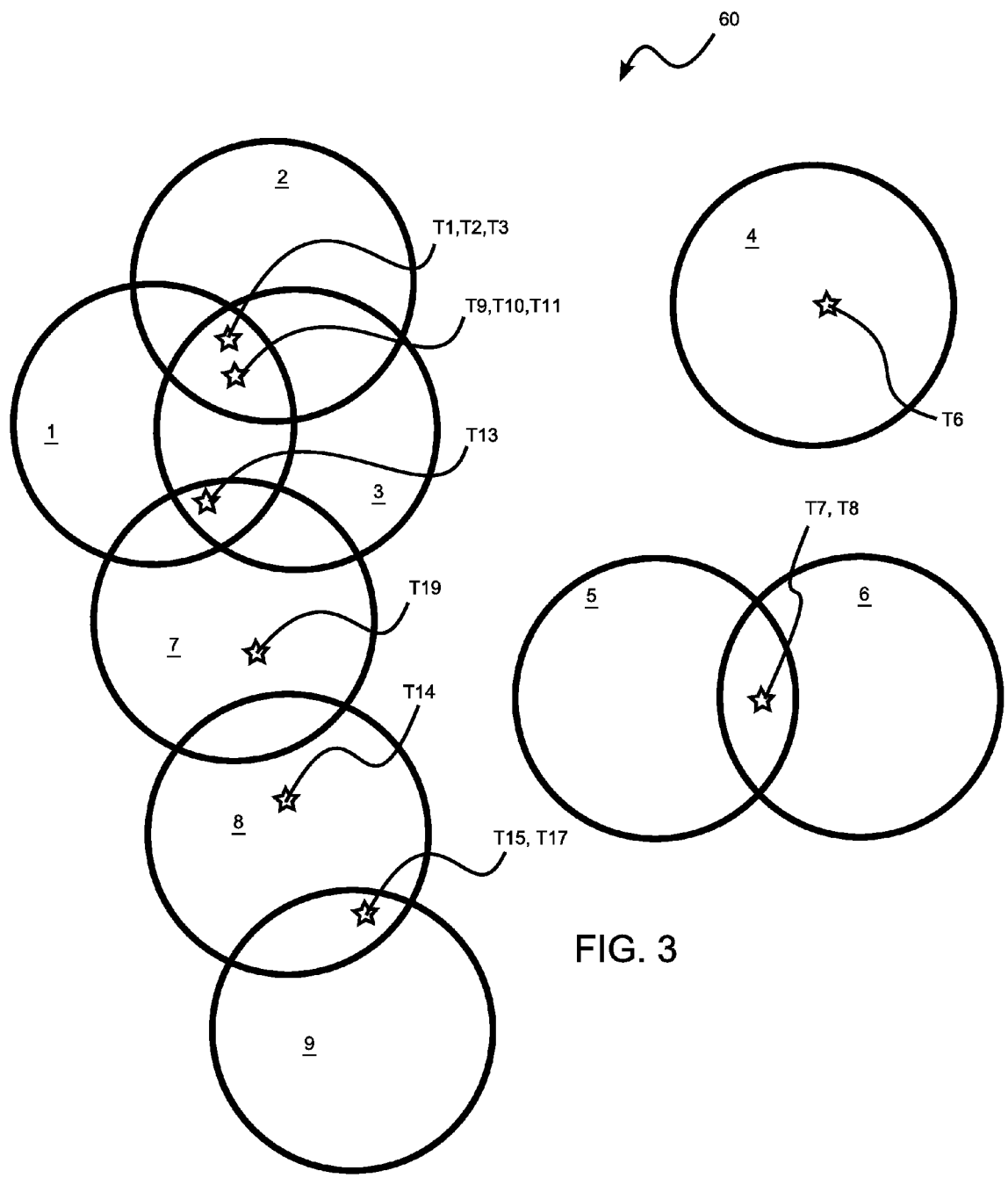
FIG. 3 shows a plan view of an example landscape including cell sector depictions and including mobile device locations determined pursuant to a preferred embodiment of the invention.
Figure 4:
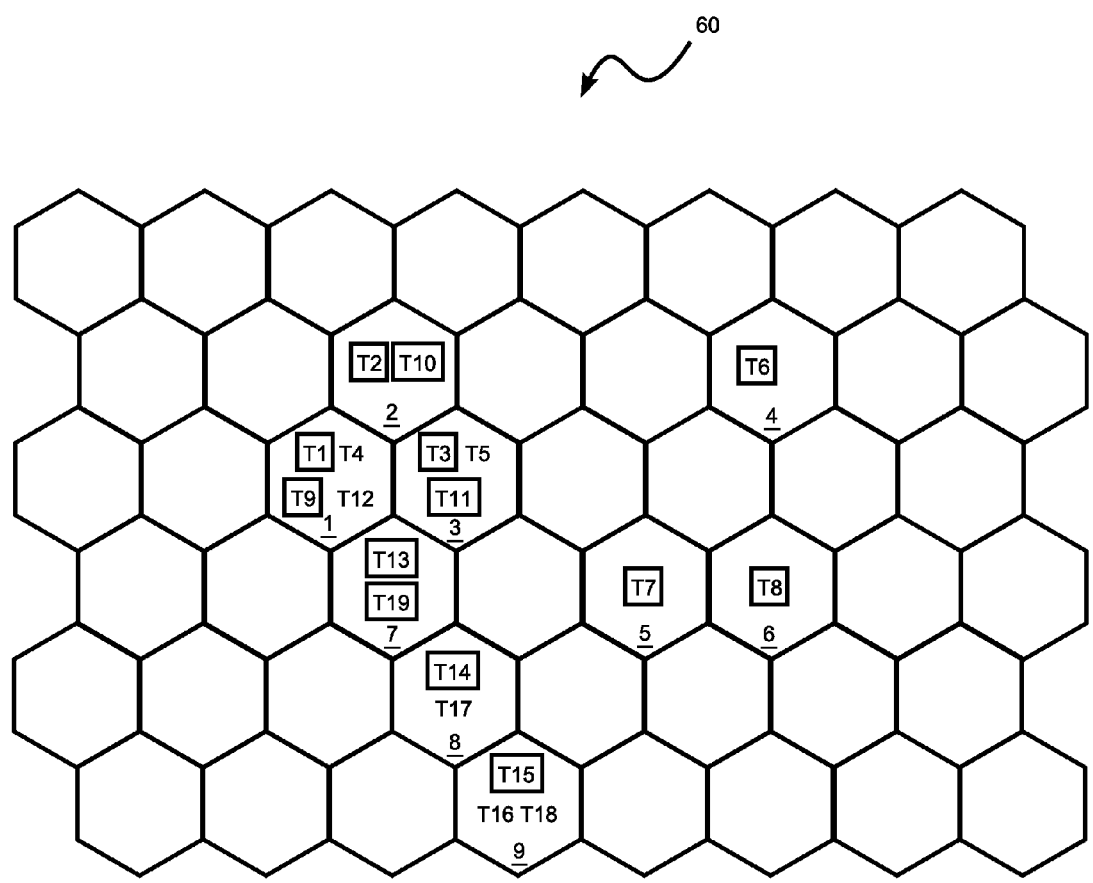
FIG. 4 shows a plan view of the landscape of FIG. 3, including idealized cell sector depictions and times corresponding to determinations of the cell sectors.

Referring to FIG. 3, a plan view of a landscape 60 is shown including determined cell sectors 1 through 9 and determined mobile device locations represented by 5 point stars at various times within the sectors 1 through 9. The sectors 1 through 9 in FIG. 3 are shown as circular with various overlapping portions as is typical in mobile cell environments. FIG. 4 shows a plan view of the landscape 60 where the cell sectors 1 through 9 are shown idealized as hexagons and the mobile device locations are not shown. In FIG. 4, each of times T1-T19 are shown in a corresponding determined cell sector, and if a location determination is performed at a particular time, the reference numeral is shown in a box. An example of an application of the preferred method 100 is shown with reference to the FIGS. 3 and 4 and Table 1 below.

TABLE 1

| Time | Cell sector | Locate/No Locate | Location same as previous? | Cell sectors marked |
|------|-------------|------------------|----------------------------|---------------------|
| T1   | 1           | Locate           |                            | 1                   |
| T2   | 2           | Locate           | Yes                        | 1, 2                |
| T3   | 3           | Locate           | Yes                        | 1, 2, 3             |
| T4   | 1           | No Locate        |                            | 1, 2, 3             |
| T5   | 3           | No Locate        |                            | 1, 2, 3             |
| T6   | 4           | Locate           | No                         | 4                   |
| T7   | 5           | Locate           | No                         | 5                   |
| T8   | 6           | Locate           | Yes                        | 5, 6                |
| T9   | 1           | Locate           | No                         | 1                   |
| T10  | 2           | Locate           | Yes                        | 1, 2                |
| T11  | 3           | Locate           | Yes                        | 1, 2, 3             |
| T12  | 1           | No Locate        |                            | 1, 2, 3             |
| T13  | 7           | Locate           | No                         | 7                   |
| T14  | 8           | Locate           | No                         | 8                   |
| T15  | 9           | Locate           | No                         | 9                   |
| T16  | 9           | No Locate        |                            | 9                   |
| T17  | 8           | Locate           | Yes                        | 8, 9                |
| T18  | 9           | No Locate        |                            | 8, 9                |
| T19  | 7           | Locate           | No                         | 7                   |

Pursuant to the method 100, at an initial time T1 the current cell sector is determined to be cell sector 1 (step 102). The cell sector 1 is compared with a cell sector list of previously determined cell sectors (step 104), which cell sector list is empty since the process begins at initial time T1, and there are no prior determined cell sectors. Accordingly, the cell sector 1 is not listed, and the current location is determined (step 106), as indicated by the star with corresponding T1, T2, T3 label in FIG. 3. The current location is compared with a last determined location stored in the history database (step 108). Since the process begins at initial time T1, no prior location is stored and the cell sector 1 is added to the list in the history database (step 110), and after the cycling time period $\Delta T_x$ (step 114), the current cell sector is determined to be cell sector 2 (step 102). The cell sector 2 is compared with the cell sector list of previously determined cell sectors (step 104), which cell sector list includes only cell sector 1. Since the cell sector 2 is not listed, the current location is determined (step 106) as indicated by the star with corresponding T1,T2, T3 label in FIG. 3, which location is compared with the last determined location stored in the history database (step 108). Since the location at time T2 is the same as the location at the previous time T1, the cell sector 2 is added to the list in the history database (step 110), and after the cycling time period $\Delta T_x$ (step 114), the current cell sector is determined to be cell sector 3 (step 102). Since the cell sector 3 is not listed, the current location is determined (step 106) as indicated by the star with corresponding T1, T2, T3 label in FIG. 3. Since the location at time T3 is the same as the location at the previous time T2, the cell sector 3 is added to the list in the history database (step 110). At time T4 the current cell sector is determined to be cell sector 1 (step 102), which cell sector is listed, and therefore no location is determined. At time T5 the current cell sector is determined to be cell sector 3 (step 102), which cell sector is listed, and therefore no location is determined.

At time T6 the current cell sector is determined to be cell sector 4 (step 102). Since the cell sector 4 is not listed, the current location is determined (step 106) as indicated by the star with corresponding T6 label in FIG. 3, which location is compared with the last determined location stored in the history database (step 108). Since the location at time T6 is not the same as the location at the previous time T5, the cell sector list is cleared and the cell sector 4 is added to the cleared list in the history database (step 112). At time T7 the current cell sector is determined to be cell sector 5 (step 102). Since the cell sector 5 is not listed, the current location is determined (step 106) as indicated by the star with corresponding T7, T8 label in FIG. 3, which location is compared with the last determined location stored in the history database (step 108). Since the location at time T7 is not the same as the location at the previous time T6, the cell sector list is cleared and the cell sector 5 is added to the cleared list in the history database (step 112). Since the location at time T8 is the same as the location at the previous time T7, the cell sector 6 is added to the list in the history database (step 110), such that for time T8, the cell sector list includes cell sectors 5 and 6. The method 100 is performed for the remaining times T9-T19 as shown in Table 1 and FIGS. 3 and 4.

Determining a cell sector is typically a process requiring low power and system resources. If the mobile device is a cellular phone, cell sector information is already needed for proper functionality, and therefore accessing it does not require significant extra battery draw. Accordingly, linking determination of location to changes in cell sector as set forth in the method 100 according to a preferred embodiment of the invention is effective in conserving such power and system resources. When in motion, a phone will cross cell sector boundaries often, and therefore using cell sector information will provide reasonable detection latency. As shown in the example above, when a cellular phone is stationary it may also switch cell sectors. Accordingly, a cell sector change alone does not necessarily indicate a mobile device is in motion. In a typical mobile environment, the cells which are seen by a stationary device, are limited, normally 2-3, and in practice a cellular phone or other mobile device does not have to move far before crossing into a cell sector it would not have seen while stationary.

Cell sector data is not the only EMF signal data that can be passively monitored while expending low power and using minimal resources. If a device has wireless networking capabilities, such as Wi-Fi™ or Bluetooth™, changes in those sources can be detected and used to check if the device has started moving. For instance, a mobile device configured to detect a Wi-Fi™, Bluetooth™, or Zigbee™ protocol signal, or a signal corresponding to other suitable protocol, can use changes in the signal source to trigger location determinations. In the same fashion, location determinations can be triggered if a mobile device is near multiple signal sources and the relative signal strengths of those sources change.

Figure 5:
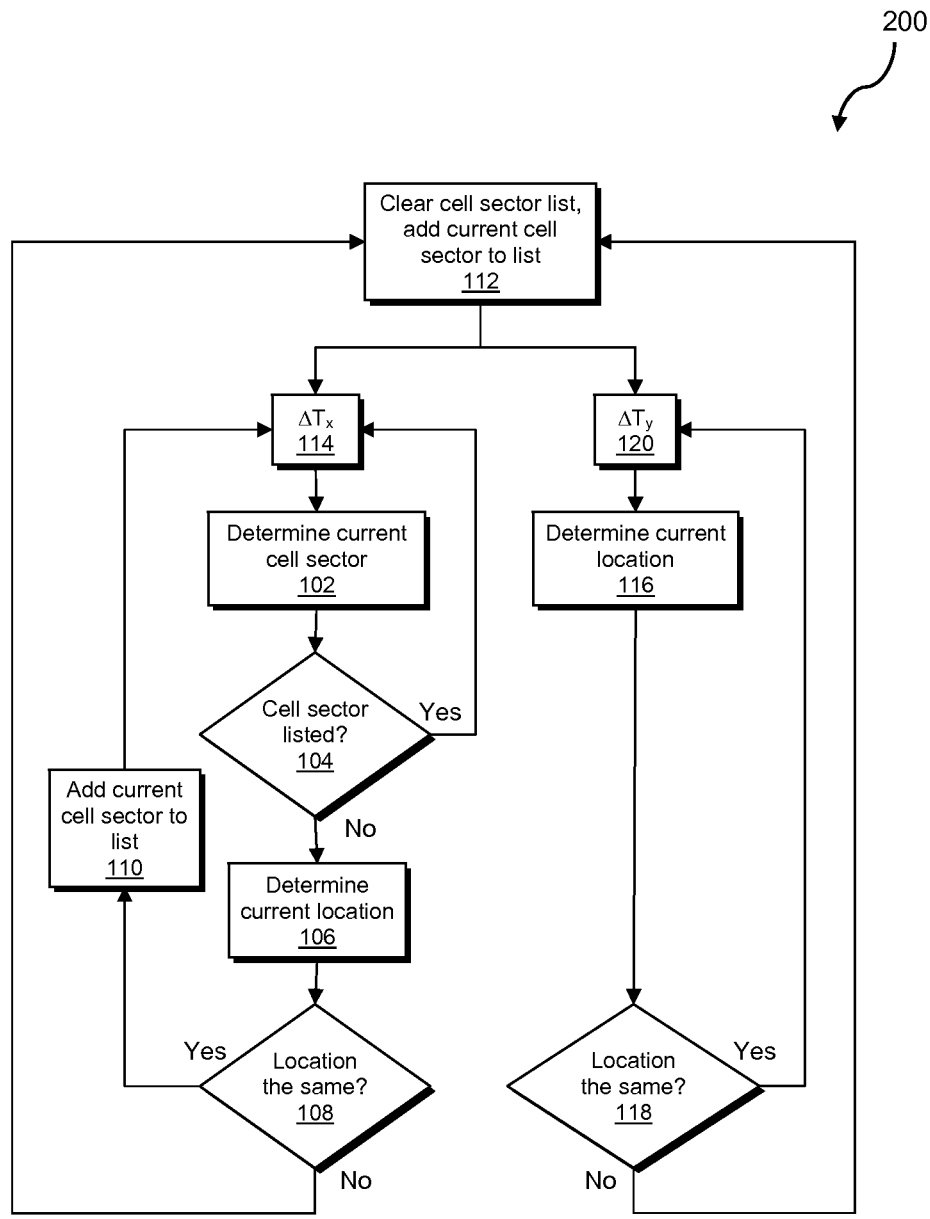
FIG. 5 shows a process diagram depicting a mobile device locating method according to a second preferred embodiment of the invention.

It would also be desirable to determine location in the absence of any change in cell sector to account for situations where a mobile device is moving but no change occurs in the cell sector in communication with the mobile device. Referring to FIG. 5, a process diagram depicting a computer-implemented mobile device locating method 200 according to a second preferred embodiment of the invention is shown. The method 200 includes steps 102-114 which function as discussed above with reference to the method 100 of the first preferred embodiment of the invention depicted in FIG. 2. The method 200 further includes a generally parallel process in which a current location of the mobile device is continually determined (step 116) after predetermined cycling time periods $\Delta T_y$ (step 120). The predetermined the cycling time period $\Delta T_y$ is preferably greater than the predetermined cycling time period $\Delta T_x$ to avoid overuse of system resources associated with determination of location. Preferably, the cycling time period $\Delta T_y$ is about 1 to 12 minutes. The current location determined in step 116 is compared with a last determined location stored in the history database (step 118). If the current location is the same as the last determined location, the process again determines the current location (step 116) after the cycling time period $\Delta T_y$ of step 120. If the current location determined in step 116 is not the same as the last determined location, the cell sector list is cleared and the current cell sector determined in step 102 is thereafter added to the cleared list (step 112), and thereafter the process returns to steps 114 and 120. The method 200 allows for determining location in the absence of any change in cell sector to account for a situation where a mobile device is moving but no change occurs in the cell sector in communication with the mobile device. Since $\Delta T_x$ is preferably less than $\Delta T_y$, the method 200 allows for more rapid location determination when cell sector changes occur, whereby location determination occurs more frequently when actual mobile device motion occurs.

Figure 6:
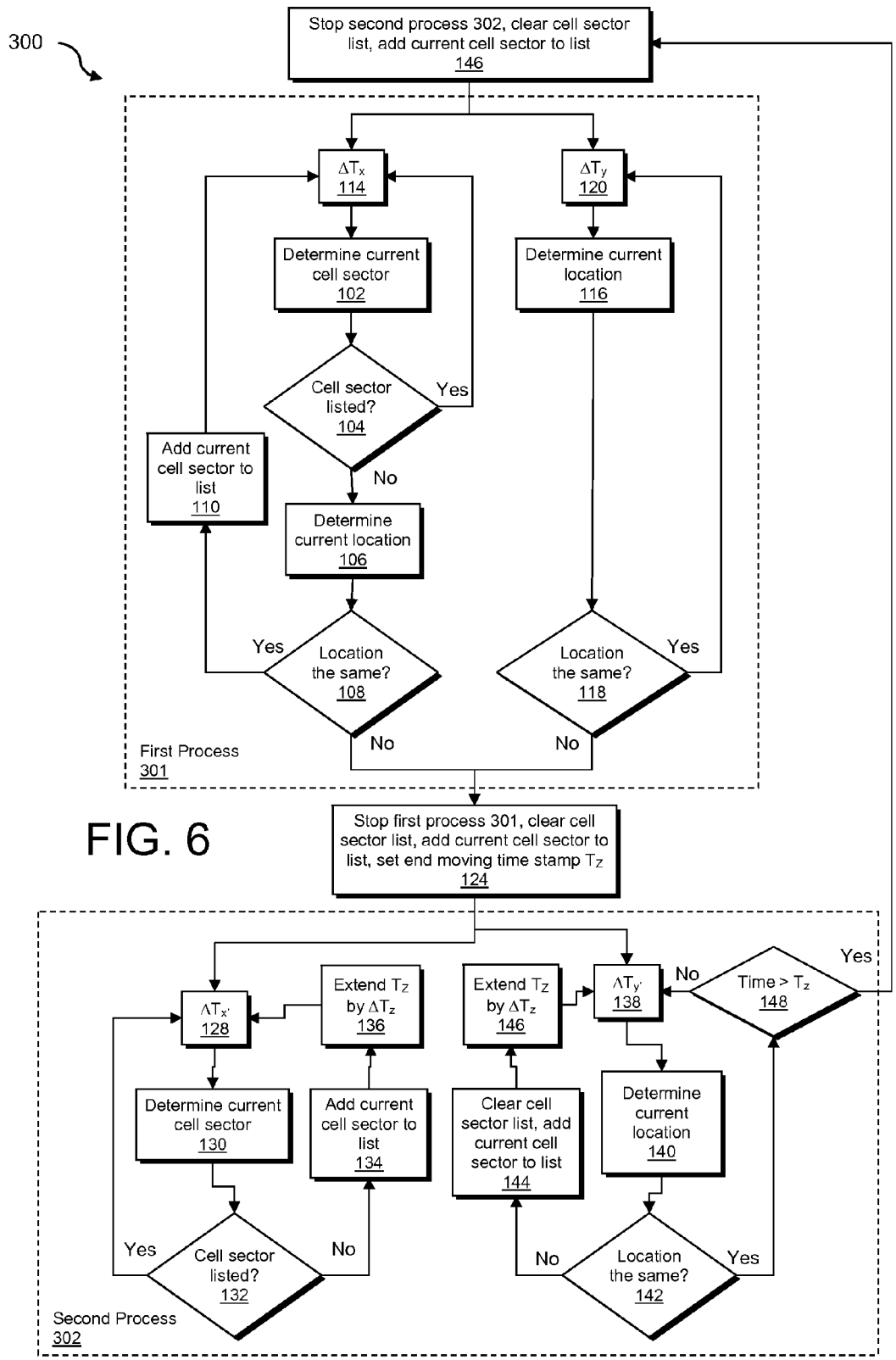
FIG. 6 shows a process diagram depicting a mobile device locating method according to a third preferred embodiment of the invention.

Referring to FIG. 6, a process diagram depicting a computer-implemented mobile device locating method 300 according to a third preferred embodiment of the invention is shown. The method 300 includes steps 102-110 and 116-120 which function substantially as discussed above with reference to the methods 100 and 200 of the first and second preferred embodiments of the invention, depicted in FIGS. 2 and 5 respectively. The method 300 is divided into a first process 301 and second process 302. If the current location is not the same as the last determined location by the comparison in either step 108 or step 118, process 301 is stopped, the cell sector list is cleared and the current cell sector is thereafter added to the cleared list (step 124), whereby the current cell sector is the only listed cell sector. The method 300 continues to step 128 and step 138 of process 302, which steps define cycling time periods $\Delta T_{x'}$ and $\Delta T_{y'}$ respectively.

The cycling time period $\Delta T_{x'}$, like time period $\Delta T_x$ of step 114, is preferably between 1 and 30 seconds, or alternatively, a period suitable for a particular application. After the cycling time period $\Delta T_{x'}$, the current cell sector is determined (step 130). The current cell sector is compared with the list of previously determined cell sectors (step 132). If the cell sector is listed, the process returns to the cycling time period $\Delta T_{x'}$ of step 128. If the cell sector is not listed, the current cell sector is added to the list of previously determined cell sectors (step 134), the end moving time stamp $T_z$ is extended by a time period $\Delta T_z$ (step 136), and the process returns to the cycling time period $\Delta T_{x'}$ (step 128).

The cycling time period $\Delta T_{y'}$ is less than the cycling time period $\Delta T_y$ to allow for more frequent location determination during times when the mobile device is perceived to be in motion. Preferably the cycling time period $\Delta T_{y'}$ is about 1/10 to 1/2 the cycling time period $\Delta T_y$. The cycling time period $\Delta T_{y'}$ is preferably variable depending on an estimated average velocity of the mobile device, which is preferably determined based on the distance between determined locations, the time between determined locations, and known paths along which a mobile device user is likely to travel. The $\Delta T_{y'}$ is preferably relatively shorter when relatively faster velocities of the mobile device are estimated, and $\Delta T_{y'}$ can be adjusted after each location determination or after a predetermined number of location determinations.

After the cycling time period $\Delta T_{y'}$, the current location of the mobile device is determined (step 140), and the current location is compared with a last determined location of the mobile device (step 142). If the current location is the same as the last determined location, or alternatively one or more prior locations, a current time is compared with the end moving time stamp $T_z$. If the current time, preferably corresponding to the mobile device clock time, is not later than the end moving time stamp, the process returns to the cycling time period $\Delta T_{y'}$ (step 138). If the cycling time period $\Delta Ty'$ is very short and/or the speed of the mobile device is very slow, it is preferable to compare the current location with more than one of the last determined locations, for example the last three locations, or one or more earlier determine locations, since it may be impractical based on the precision of the location determining resource to deduce if the mobile device has ceased motion under such conditions. Further, it may be undesirable to make a determination that the current location is the same as a prior determined location if in fact the mobile device is only stopped for a brief period at a current time.

If the current time is later than the end moving time stamp, the second process 302 is stopped, the cell sector list is cleared and the current cell sector is added to the list (step 146), after which the first process 301 is restarted at steps 114 and 120. If in the comparison at step 142 the current location is determined not to be the same as the last determined location, the cell sector list is cleared and the current cell sector is thereafter added to the list (step 144), after which, the end moving time stamp $T_z$ is extended by a time period $\Delta T_z$ (step 146), and the process returns to the cycling time period $\Delta T_{y'}$ (step 128). As, shown, the second process 302 of the method 300 potentially allows for location determination of higher frequency than the first process 301 until a current time is later than the end moving time stamp $T_z$. The end moving time stamp $T_z$ is extended (steps 136, 146) in response to determined changes in cell sector (step 132) and determined changes in location (step 142) to increase the likelihood that the mobile device is not in motion before returning to the first process 301. As shown, the first process 301 corresponds to the cycling time period $\Delta T_y$, which is longer than the cycling period $\Delta T_{y'}$, and accordingly, it is preferred that the second process 302 is active for times when the mobile device is in motion.

As described above, the first process 301 corresponds to a process active at a time where there is a relatively high probability that the mobile device is static, described hereinafter as a static state process. The second process 302 corresponds to a process active at a time where there is a relatively high probability that the mobile device is in motion, described hereinafter as a mobile state process. It is preferable to minimize determination of location during the static state process to conserve mobile device power and other resources for use in the mobile state process.

Locating at a high frequency when a device is moving while maintaining a low number of locates overall for a given period of time is only possible if the device spends large amounts of time stationary. If a device spends a significant amount of time mobile, locating at a high frequency may not be feasible. It is preferable to protect against such a situation by reducing the polling frequency should the mobile device stay mobile too long. Cycling period $\Delta T_{y'}$ is preferably variable and is lengthened after a predetermined period of time in which the second process 302 is active to conserver resources. Further, if a mobile device's battery charge is low, the cycling periods $\Delta T_{y'}$, $\Delta T_y$, and $\Delta T_x$ are preferably lengthened, as it is better to get slightly worse data than no data at all, which is what may occur if a mobile device's battery is drained. It is also preferable to decrease the cycling period $\Delta T_y$ as a compensation measure based on failure to detect cell sector changes or in areas where cell sector state change latency is poor, such as in rural areas with sparsely located cell sites.

Figure 7:
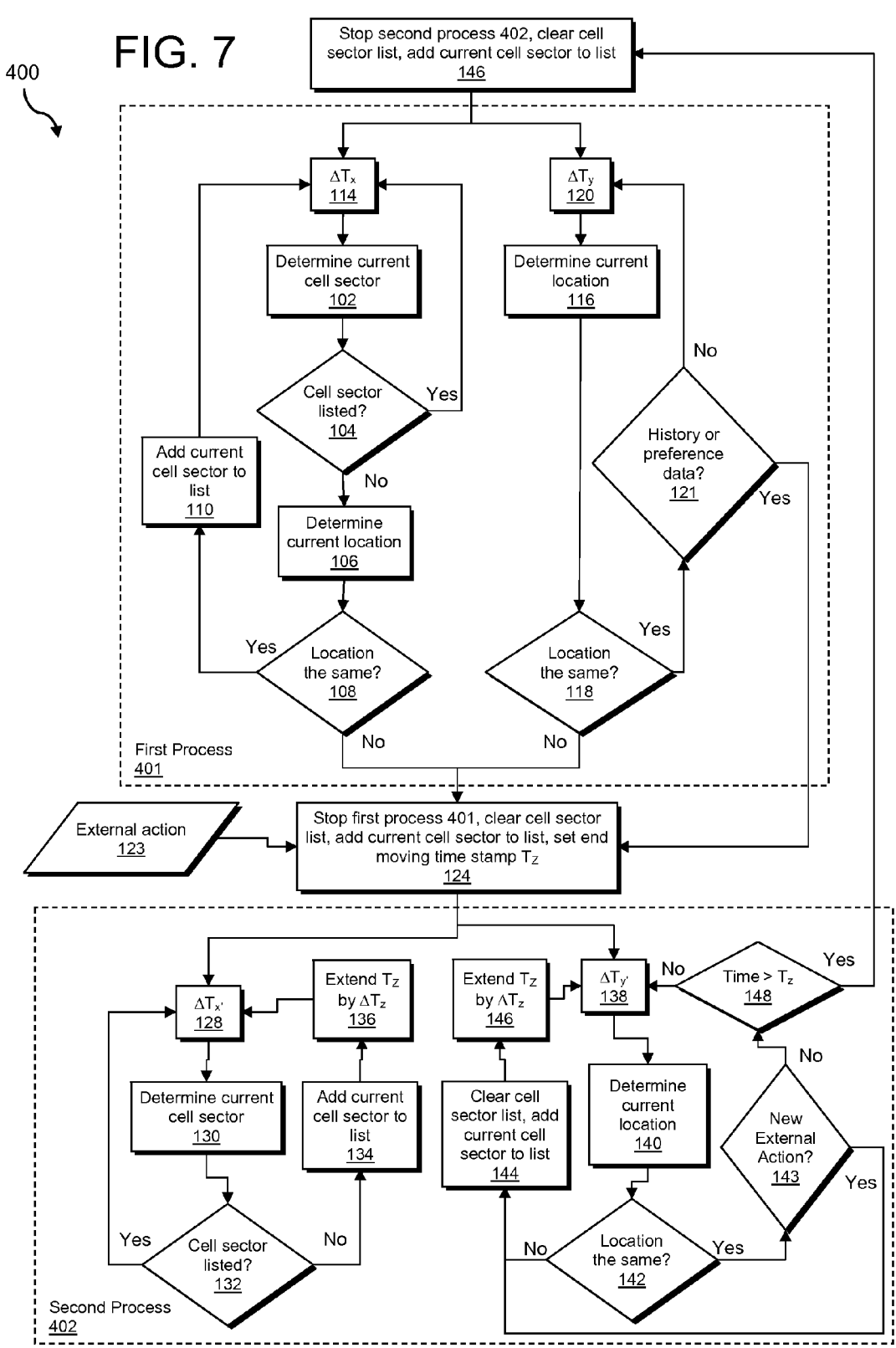
FIG. 7 shows a process diagram depicting a mobile device locating method according to a fourth preferred embodiment of the invention.

Referring to FIG. 7, a process diagram depicting a computer-implemented mobile device locating method 400 according to a fourth preferred embodiment of the invention is shown. The method 400 includes steps 102-114 and 116-120 which function substantially as discussed above with reference to the methods 100, 200 and 300 of the first, second and third preferred embodiments of the invention, depicted in FIGS. 2, 5 and 6 respectively. The method 400 is divided into a first process 401 and second process 402.

If the current location is determined at the step 118 to be the same as a last determined location, the process continues to step 121 to compare a current time with past location changes stored in the history database. If the current time, preferably the mobile device clock time, corresponds with a location change which occurred at a prior date or a plurality of prior dates, the process continues to step 124 in which the first process 401 is stopped, the cell sector list is cleared, the current cell sector is added to the list, and the end moving time stamp Tz is set. A current time can correspond to a prior date's time when it is a predetermined length of time before the prior date's or dates' time or substantially equals the prior date's or dates' time. Preferably, if the history database indicates a pattern of location change on a particular day at a particular time, the process continues to step 124 when the current time corresponds to the particular time, whereby the second process 402 is started corresponding to the more frequent location determinations resulting from the shorter $\Delta T_{y'}$ at step 138. Similarly, for times during a week when the history database indicates that the mobile device is typically static, decreased frequency location polling can be applied corresponding to a longer $\Delta T_y$ or $\Delta T_x$.

In one example of an application of step 121, if the history database indicates that on four preceding weekdays Wednesday, Tuesday, Monday and Friday, excluding weekend days Sunday and Saturday, the mobile device was in motion at various times between 6:00 pm and 8:00 pm, and if the current time is near or between 6:00 pm and 8:00 pm on a Thursday, the process continues to step 124 where the end moving time stamp is set for approximately two hours from the current time, or alternatively until approximately 8:00 pm, to permit increased frequency location polling during periods when motion is likely to occur. In another example of an application of step 121, if the history database indicates that on each Thursday and Friday a location change occurs between the hours of 2:00 pm and 3:00 pm, but there is no pattern of location change for other days of the week between 2:00 pm and 3:00 pm, and if the current time is near or between 2:00 pm and 3:00 pm on a Thursday or Friday, the process continues to step 124 where the end moving time stamp is set for approximately one hour from the current time, or alternatively until approximately 3:00 pm, to permit increased frequency location polling during periods when motion is likely to occur. Since mobile users often have fixed schedules, for example set times to arrive at work on Monday through Friday, set times to have lunch, and set days without work such as Saturday and Sunday, the location history is helpful for scheduling more frequent location determinations at times which the location history suggests are likely to correspond to the mobile device being in motion.

Alternatively, a user can input times when or locations where it is desired to have more frequent location polling, which data can be used to be used in step 121 in triggering the second process 302. Alternatively, a user can input times when or locations where it is desired to have less frequent location polling. A location stream is only useful if there is a consumer of that stream, either a person or another application. It is possible that a consumer, herein described as a user, is more interested in certain situations than others. If the user is desirous to determine if the device has entered a certain area, it is more important to get accurate location data when the device is near the area boundary than if the mobile device is very far away from the area of interest. Alternatively, the user may need better location during a specific time period. The mobile device database, such as the mobile device database 820 of the mobile device 802, can receive a list of geographic areas or time periods, which can be broad or specific, and an associated location priority. Polling frequency can be set based on the priority with greater polling frequency corresponding to greater priority associated with a location or time period. While monitoring network activity is typically not as resource intensive as activating location resources such as GPS systems, monitoring network activity does have a resource cost, therefore it is preferably to transmit location and time priority data to a device efficiently. In a preferred embodiment, a message, such as an SMS, is sent to a mobile device such as the mobile device 802 with instructions for the device to connect to a server to receive a new set of location and time priority data. Alternatively, at times the mobile device is in communication with the location stream consumer or user, the consumer or user can provide input with instructions for the device to retrieve new priority data. For example, a remote application server 832 can provide support for an application executed by the mobile device 802 via the network 860.

Step 124 is further triggered by detection of an external action upon the mobile device (step 123). The detection of the external action in step 123 preferably includes the detection of light or other radiation on the mobile device by a light sensor such as the light sensor 812 on the mobile device 802 of FIG. 9. The detection of the external action preferably further can include the detection of acceleration or motion of the mobile device by a motion sensor, which is preferably an accelerometer, such as the motion sensor 814 on the mobile device 802. As shown, detection of an external action results in activation of the second process 402 corresponding to the more frequent location determinations resulting from the shorter cycling period $\Delta T_{y'}$ of step 138. Preferably, in a step 143, if an external action is detected during the second process 402, the process continues to step 144, clearing the cell sector list, adding the current cell sector to the cleared list and subsequently extending the end moving time stamp $T_z$ (step 146).

Preferably acceleration and radiation data is filtered such that a certain predetermined threshold of incident acceleration and radiation is required in step 123, so an insignificant input will not cause a trigger of step 124. Acceleration data is preferably analyzed to determine whether acceleration corresponds to a user walking, wherein walking motion does not trigger a location determination, or alternatively triggers a location determination at a low frequency since walking may not be an indicator of a prospective significant location change. Gradual changes in incident radiation, for example corresponding to changes in times of day, preferably do not trigger location determination or changes in frequency of location determination.

The detection of an external action in the step 123 can further include detection of when a mobile device is plugged into an external power source. When an external power source is connected to the mobile device, battery drain is not typically relevant. The mobile device can be located periodically at the relatively shorter cycling period $\Delta T_{y'}$, or alternatively a cycling period shorter than $\Delta T_{y'}$ or even a substantially constant location feed if supported by the location resource, without the adversely affecting a device battery charge. If it is determined in step 142 that location remains the same for a predetermined period of time, stationary locations may be thrown out rather than added to the location stream. This way, the mobile device can limit its usage of other resources such as storage space or network bandwidth.

Preferably, the mobile device according to the invention is enabled for detection of whether the external power source is stationary, such as household line power, or mobile, such as a automobile power source. If the detection of the external action indicates that the mobile device is connected to a stationary external power source, no acceleration of the cycling period $\Delta T_{y'}$ results and periodic determination of the location of the device based on periods $\Delta T_y$ and $\Delta T_{y'}$ can be reduced or stopped altogether until the stationary power source is disconnected, since it is reasonable to assume that a device that is attached to a stationary power source will stay stationary, as power cords are limited in length. It is preferred that periodic determination of the location of the device is stopped or reduced in frequency if the device is connected to a stationary power source and the device returns a stationary location for a continued period of time. Moreover, if it is detected that a device is unplugged from a power source whether mobile or stationary, it is preferable to determine the location of the device at a relatively high rate a predetermined number of times in the near future after the device is unplugged since unplugging of a mobile device may be a sign that the mobile device is about to change location.

Figure 8A:
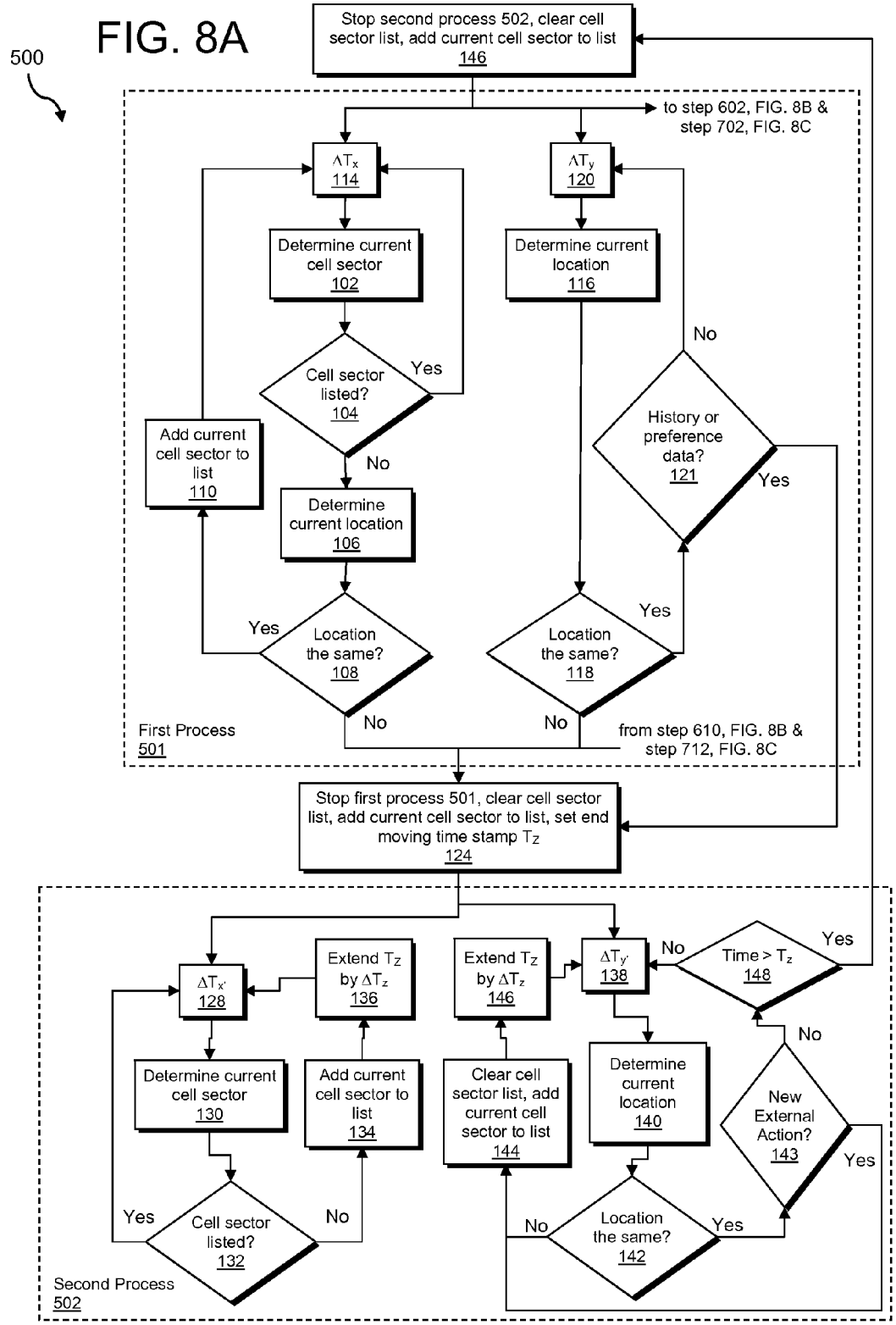

Referring to FIGS. 8A-8C, a process diagram depicting a computer-implemented mobile device locating method 500 according to a fifth preferred embodiment of the invention is shown. The method 500 includes steps which function substantially as discussed above with reference to the method 400 of the fourth preferred embodiments of the invention, depicted in FIG. 7. The method 500 is divided into a first process 501 and a second process 502. Step 123 is not included in FIG. 8A, and detailed external action processes are included in FIGS. 8B and 8C respectively corresponding to a motion detection process 600 and a light detection process 700 performed integral with the first process 501.

It is determined in a step 604 whether acceleration of the mobile device is detected. If no acceleration is detected, a cycling time period $\Delta T_a$ is invoked (step 602) and step 604 is repeated until acceleration is detected. If acceleration is detected, it is preferably determined if the acceleration meets predetermined criteria (step 606). The predetermined criteria can include that the acceleration does not correspond to walking motion or that the acceleration generally corresponds to a predetermined magnitude, duration and/or period. If the acceleration does not meet the predetermined criteria, the process returns to the cycling time period $\Delta T_a$ (step 602). If the acceleration does meet the predetermined criteria, a current location is determined (step 608), and the current location is compared with the last determined location, or alternatively, a plurality of previously determined locations (step 610). If it is determined that the location is the same as the last determined location, or alternatively, the plurality of previously determined locations, the process returns to the cycling time period $\Delta T_a$ (step 602). If it is determined that the location is not the same as the last determined location, or alternatively the plurality of previously determined locations, the process continues to step 124 and continues to the second process 502 corresponding to accelerated location polling.

It is determined in a step 702 whether light is detected. If light is detected, a cycling time period $\Delta T_r$ (step 704) is invoked, and step 702 is repeated until light is no longer detected. If light is not detected, a cycling time period $\Delta T_m$ is invoked (step 706) after which light is detected again (step 708). If light is not detected in step 708, the cycling time period $\Delta T_m$ (step 706) is again invoked, and step 708 is repeated until light is detected. If light is detected in step 708, a current location is determined (step 710) and the current location is compared with the last determined location, or alternatively, a plurality of previously determined locations (step 712). If it is determined that the location is the same as the last determined location, or alternatively, the plurality of previously determined locations, the process returns to the cycling time period $\Delta T_r$ (step 704). If it is determined that the location is not the same as the last determined location, or alternatively, the plurality of previously determined locations, the process returns to step 124 and continues to the second process 502 corresponding to accelerated location polling.

Figure 10:
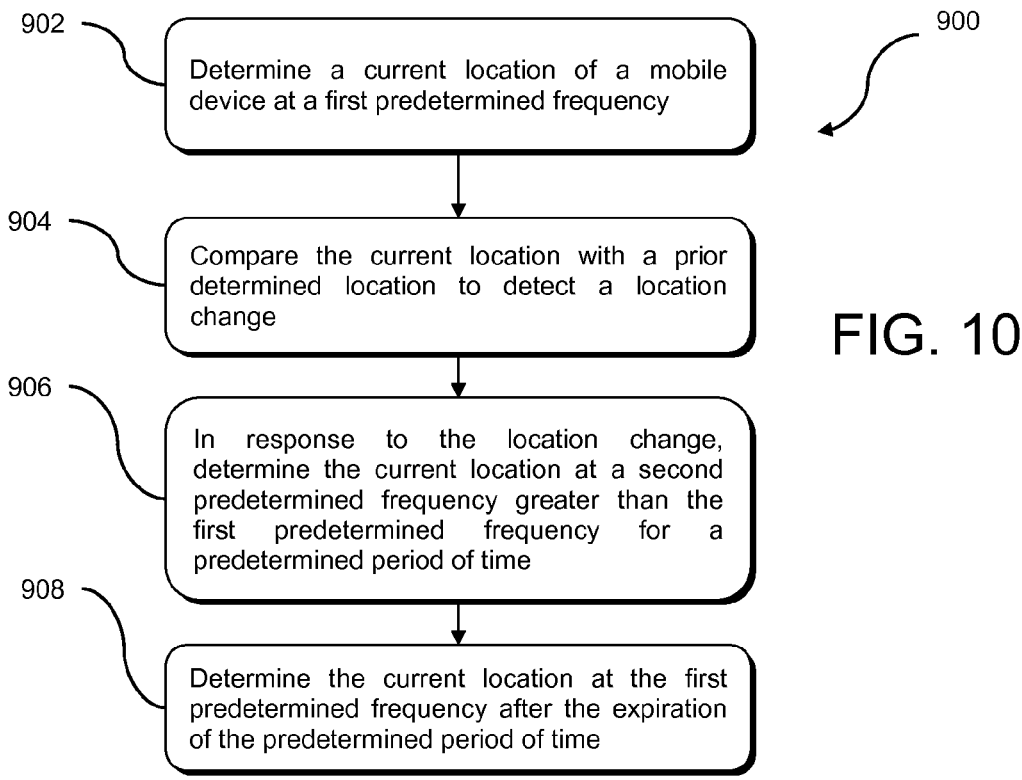
FIG. 10 is a flow chart showing a mobile device locating method according to a sixth preferred embodiment of the invention.

Referring to FIG. 10, a flow chart depicting a mobile device locating method 900 according to a sixth preferred embodiment of the invention is shown. The method 900 includes determining a current location of a mobile device at a first predetermined frequency (step 902). The current location is compared with a prior determined location to detect a location change (step 904). The current location is determined at a second predetermined frequency greater than the first predetermined frequency for a predetermined period of time which defines an end moving time stamp in response to the location change (step 906), and the current location is determined at the first predetermined frequency after the expiration of the predetermined period of time (step 908). Preferably, the value of the second predetermined frequency is set based on the distance between the current location and the prior determined location, which is preferably the last determined location, wherein a greater distance corresponds to a greater second predetermined frequency, whereby if the mobile device is moving at a high rate, the location determinations will occur more frequently to maintain the accuracy of the location information. During the predetermined period of time prior to the end moving time stamp, the value of second predetermined frequency preferably changes based on each substantial determined change in distance between the current location and the last determined location, whereby increases in a rate of travel of the mobile device will typically result in increases in the second predetermined frequency. Further, during the predetermined period of time corresponding to the end moving time stamp, the predetermined period of time is preferably extended with each determined change in the current location, whereby the end moving time stamp is extended with each determination that the current location is not substantially the same as the prior determined location.

Figure 11:
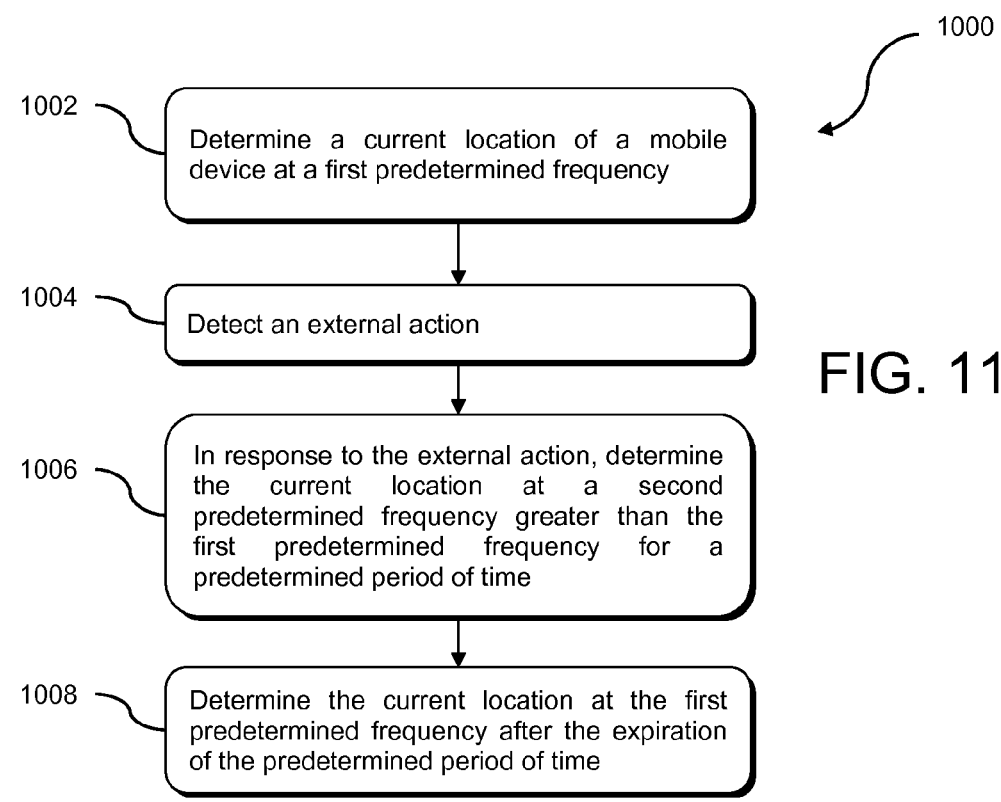
FIG. 11 is a flow chart showing a mobile device locating method according to a seventh preferred embodiment of the invention.

Referring to FIG. 11, a flow chart depicting a mobile device locating method 1000 according to a seventh preferred embodiment of the invention is shown. The method 1000 includes determining a current location of a mobile device at a first predetermined frequency (step 1002). An external action is detected (step 1004). The current location is determined at a second predetermined frequency greater than the first predetermined frequency for a predetermined period of time which defines an end moving time stamp in response to the external action (step 1006), and the current location is determined at the first predetermined frequency after the expiration of the predetermined period of time (step 1008). During the predetermined period of time corresponding to the end moving time stamp, the predetermined period of time is preferably extended with each detected external action. Detecting the external action can include receiving an indication from a light sensor of a change in a level of incident radiation on the mobile device or receiving an indication from a motion detector of an acceleration of the mobile device.

Figure 12:
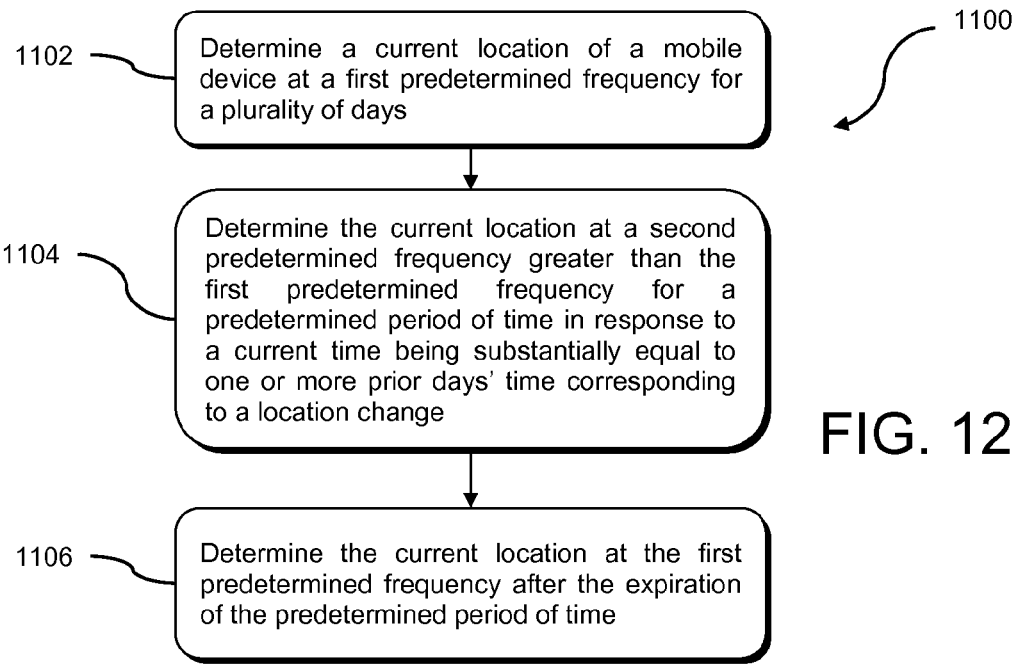
FIG. 12 is a flow chart showing a mobile device locating method according to an eighth preferred embodiment of the invention.

Referring to FIG. 12, a flow chart depicting a mobile device locating method 1100 according to an eighth preferred embodiment of the invention is shown. The method 1100 includes determining a current location of a mobile device at a first predetermined frequency for a plurality of days (step 1102). The current location is determined at a second predetermined frequency greater than the first predetermined frequency for a predetermined period of time which defines an end moving time stamp in response to a current time being substantially equal to at least one prior day's time corresponding to a location change (step 1104). Alternatively, the current location is determined at the second predetermined frequency in response to a current time being a predetermined length of time earlier than at least one prior day's time. Alternatively, the current location is determined at the second predetermined frequency in response to a current time being substantially equal to or a predetermined length of time prior to a predetermined range of time including the at least one prior day's time, which preferably includes a plurality of prior day's times which define the range. Alternatively, the current location is determined at the second predetermined frequency in response to a current time being substantially equal to or a predetermined length of time earlier than a user-specified or application-specified time period. Alternatively, the current location is determined at the second predetermined frequency in response to a current location corresponding to a user-specified or application-specified location or a predetermined distance from the user-specified or application-specified location. The mobile device or other system implementing the method 1100 is preferably configured to receive user-specified and application-specified time periods and locations from a local source or from a remote source via a network connection, such as via the network 860 connecting the remote application server 832 to the mobile device 802. The current location is determined at the first predetermined frequency after the expiration of the predetermined period of time (step 1106).

Figure 13:
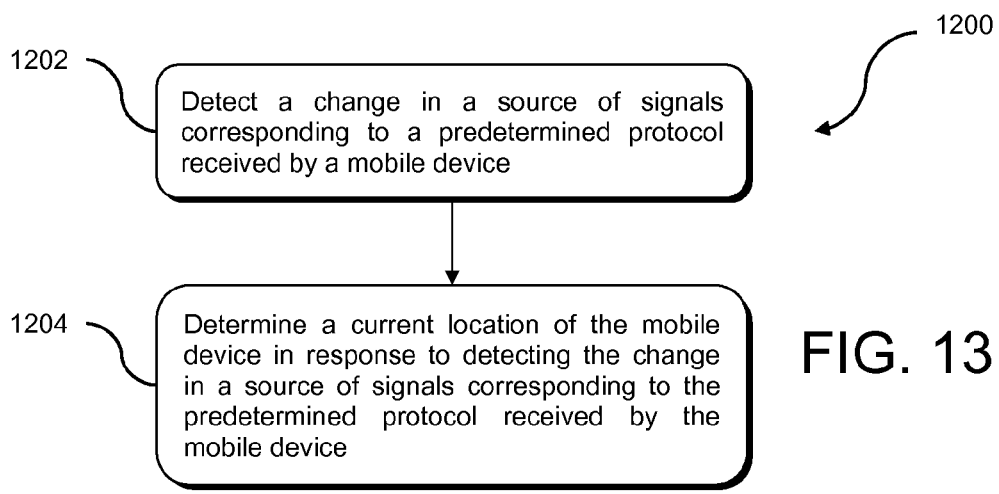
FIG. 13 is a flow chart showing a mobile device locating method according to an ninth preferred embodiment of the invention.

Referring to FIG. 13, a flow chart depicting a mobile device locating method 1200 according to a ninth preferred embodiment of the invention is shown. The method 1200 includes detecting a change in a source of signals corresponding to a predetermined protocol received by a mobile device (step 1202), or alternatively, a change in a strength of signals corresponding to a predetermined protocol received by the mobile device. A current location of the mobile device is determined in response to detecting the change in a source of signals corresponding to the predetermined protocol received by the mobile device (step 1204), or alternatively, in response to the change in the strength of signals corresponding to the predetermined protocol received by the mobile device. The change in the source of or the strength of the signals corresponding to the predetermined protocol may be indicative of a cell sector change, and a cell sector change can be detected based on the detected signal source change or signal strength change, and the current location of the mobile device can be determined based on the detected cell sector change. The predetermined protocol can alternatively correspond to any suitable wireless protocol including but not limited to Wi-Fi™, Bluetooth™, and Zigbee™

While the preferred embodiments of the invention have been described in detail above, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. A computer implemented mobile device locating method, wherein each step is performed by at least one network-connectable computing device, the method comprising:
    detecting at least one of a change in a source of signals corresponding to a particular protocol received by a mobile device and a change in a strength of signals corresponding to a particular protocol received by the mobile device; and
    determining a current location of the mobile device in response to detecting the at least one of the change in a source of signals corresponding to the particular protocol received by the mobile device and the change in the strength of signals corresponding to the particular protocol received by the mobile device.

2. The computer implemented method of claim 1, further comprising detecting a cell sector change and determining the current location of the mobile device in response to detecting the cell sector change.

3. The computer implemented method of claim 1, wherein the particular protocol of the signals comprises at least one of a Wi-Fi ™, Bluetooth ™, and Zigbee ™ protocol; and wherein detecting the at least one of the change in a source of signals corresponding to the particular protocol received by the mobile device and the change in the strength of signals corresponding to the particular protocol received by the mobile device comprises detecting a change in at least one of a Wi-Fi ™, Bluetooth ™, and Zigbee ™ protocol signals.

4. The computer implemented method of claim 1, further comprising determining the current location of the mobile device at a predetermined frequency for a predetermined period of time in response to detecting the at least one of the change in a source of signals corresponding to the particular protocol received by the mobile device and the change in the strength of signals corresponding to the particular protocol received by the mobile device.

5. A mobile device comprising at least one processor and at least one non-transitory memory comprising instructions operable to enable the at least one processor to perform a procedure comprising:
- detecting at least one of a change in a source of signals corresponding to a particular protocol received by the mobile device and a change in a strength of signals corresponding to a particular protocol received by the mobile device; and
- determining a current location of the mobile device in response to detecting the at least one of the change in a source of signals corresponding to the particular protocol received by the mobile device and the change in the strength of signals corresponding to the particular protocol received by the mobile device.

* * * * *